US008559081B2

(12) United States Patent
Crean

(10) Patent No.: US 8,559,081 B2
(45) Date of Patent: Oct. 15, 2013

(54) SYSTEM AND METHOD FOR DETERMINING A BILLING STRUCTURE FOR DOCUMENTS BASED ON MARKING MEDIUM PREDICTIONS

(75) Inventor: Peter A. Crean, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 722 days.

(21) Appl. No.: 12/790,388

(22) Filed: May 28, 2010

(65) Prior Publication Data

US 2011/0292413 A1    Dec. 1, 2011

(51) Int. Cl.
*G03F 3/08* (2006.01)
(52) U.S. Cl.
USPC ............... 358/518; 705/29; 399/27; 347/19; 347/20; 347/240
(58) Field of Classification Search
USPC ........................ 358/1.8, 1.9, 3.23, 455, 518
See application file for complete search history.

(56) References Cited

U.S. PATENT DOCUMENTS

| | | | |
|---|---|---|---|
| 4,065,031 A | 12/1977 | Wiggins et al. | |
| 5,204,699 A | 4/1993 | Birnbaum et al. | |
| 5,867,198 A | 2/1999 | Gwaltney et al. | |
| 6,844,937 B2 | 1/2005 | Dempsey et al. | |
| 8,300,266 B2 * | 10/2012 | Yeh et al. | 358/1.9 |
| 2006/0227395 A1 * | 10/2006 | Mestha et al. | 358/518 |
| 2009/0099980 A1 | 4/2009 | Ni et al. | |
| 2009/0195799 A1 | 8/2009 | Malik et al. | |
| 2009/0195800 A1 | 8/2009 | Malik et al. | |
| 2009/0195801 A1 | 8/2009 | Malik et al. | |

OTHER PUBLICATIONS

Ramesh Nagarajan, U.S. Appl. No. 12/166,874, filed Jul. 2, 2008.
Ramesh Nagarajan, U.S. Appl. No. 12/246,956, filed Oct. 7, 2008.
David Fuller Coffey, U.S. Appl. No. 12/580,686, filed Oct. 16, 2009.
Ashlee Vance, New Inks Cut Costs of Office Color Printing, www.newyorktimes.com, May 6, 2009.

* cited by examiner

*Primary Examiner* — Benny Q Tieu
*Assistant Examiner* — Juan M Guillermety
(74) *Attorney, Agent, or Firm* — Pillsbury Winthrop Shaw Pittman, LLP

(57) ABSTRACT

Disclosed is a method for processing raster image data and determining via a reference device (e.g., LUT), an amount of marking medium (toner, ink) to be used for printing a document. Then billing costs based on the amount of medium is determined. In particular, a calibration method may be performed on an apparatus to determine the amounts of medium used for that particular apparatus. The calibration method includes printing pages with test patches for a plurality of colors at a particular dot value (or density), and weighing similar printed test pages so that the amount of medium used to print colors at particular dot values is determined by subtracting a weight of the pages before printing from the weight of the printed test pages. The change in weight (or mass) of the medium is used to populate the reference device for that apparatus.

20 Claims, 8 Drawing Sheets

SYSTEM AND METHOD FOR DETERMINING A BILLING STRUCTURE FOR DOCUMENTS BASED ON MARKING MEDIUM PREDICTIONS

BACKGROUND

1. Field

The present disclosure is generally related to choosing a billing structure for printing a document based on an electronic file, and, in particular, to a system and method for determining a billing structure for outputting documents based on an estimated amount of marking medium (toner or ink) needed to print the document.

2. Description of Related Art

Image data comprises a number of pixels having a number of components that contribute to defining the image, such as color and intensity. The image data generally includes various color or gray levels, which contribute to the intensity of each pixel in the image. Each pixel of the image is assigned a number representing the amount of light or gray level for that space at that particular spot; i.e., the shade of gray in the pixel. Binary image data has two possible values for each pixel, black (represented by the number "1") or white (represented by the number "0"). Images that have a large range of shades are referred to as grayscale images. For example, grayscale images have an 8-bit value (or higher) per pixel comprising 256 tones or shades of gray for each pixel in the image (gray level of 0 to 255). Grayscale image data may also be referred to as continuous tone or contone image data. The pixels in a color image may be defined in terms of a color space, typically with three values, such as RGB—R for red, G for green, and B for blue—or four values, such as CMYK—C for cyan, M for magenta, Y for yellow, and K for black, or composite black.

The pixels may also be defined in terms of device independent space (e.g., when inputting image data, such as standard RGB (sRGB) or CIE L*a*b*) or a device dependent space (e.g., when outputting image data, such as RGB or CMYK). When outputting image data to an output device (e.g., copier, printer, or multi-function device (MFD)), printing documents using black ink or toner is generally less expensive than using colored ink or toner. Thus, billing is often based on the amount of color content contained in the job to be printed. In order to bill customers for color printing, color detection is an important feature required in an image path. Color detection is used to analyze documents for presence of color as well as an amount of color in order to bill customers accordingly. Generally, the higher the presence and amount of color in a document, the higher the cost.

Some systems include counting the number of pixels in the image data of the document to be printed. Some available techniques are based on an area coverage methodology developed for offset presses, or are based on comparisons to a small set of documents with measured area coverage. For example, in offset printing, ink estimates were based off of the area of the exposed plate, i.e., measured area coverage (or percentage) for printing a page. Several ad hoc extensions to offset tools have been developed. However, such tools can be highly inaccurate. Some versions of these available tools may produce answers varying by different factors when processing the same document. For example, the Xerox® 490/980 color printing system can show the customer (e.g., via an interface) multiple one page documents and their predicted area coverages which are predicted by running the document through a complete machines simulator program. Such predicting, however, can require an ample amount of time (e.g., one day per page). Then, to estimate toner usage to a given job, the customer is asked to choose the document closest to his job, or to interpolate between the multiple presented documents. This may produce inaccurate estimations each time a document or page is printed. Similarly, third party plug-ins used to analyze documents may also give unrealistic results.

For digital print systems, such as Xerographic systems, the relationship between the exposed image and the toner/ink used for printing a page or document may be much more complex. This may include extensive simulation and some knowledge of the actual machine parameters to predict toner/ink usage. Edge enhancement, developer age, and separation to separation interactions can also make estimating toner usage difficult. In some large production systems, large sumps and well-buffered toner delivery systems translate to thousands and/or tens of thousands of pages that must be printed before getting reliable toner/ink usage numbers.

Digital printers are reaching higher speeds for output and lower per page costs. The actual toner/ink usage is becoming a larger part of the total cost of a print job. As challenges in digital printing are offset by longer runs, a more precise estimation of print costs for a print system may be desirable. For example, previous estimations of per page print jobs may have underestimated the cost for an amount of toner/ink to output a page. In current systems, toner or ink can easily constitute 70% of the per page print cost.

Accordingly, an improved system and method of determining the amount of toner/ink for printing a document and correctly billing customers is desirable.

BRIEF SUMMARY

One aspect of the disclosure provides a method for determining an amount of marking medium required for outputting documents using an image processing apparatus, the image processing apparatus comprising a processor for processing documents containing image data, the image processing apparatus configured to output a gamut of colors. The method includes:

printing a plurality of test pages for a plurality of colors within the gamut with the image processing apparatus, each test page comprising a test patch of marking medium representing image data comprising a plurality of pixels at a particular dot value; and for test pages with test patches of a same color and a particular dot value,
  weighing the printed test pages, and
  calculating an amount of marking medium used to print the color at the particular dot value by subtracting a weight of the pages before printing from the weight of the printed test pages, and
populating a reference device with the calculated amounts of marking medium for at least the plurality of colors.

Another aspect of the disclosure provides a computer readable medium having stored computer executable instructions, wherein the computer executable instructions, when executed by a computer, directs a computer to perform a method for determining an amount of marking medium required for outputting documents using an image processing apparatus configured to output a gamut of colors. The method includes:

printing a plurality of test pages for a plurality of colors within the gamut, each test page comprising a test patch of marking medium representing image data comprising a plurality of pixels at a particular dot value;

for test pages with test patches of a same color and a particular dot value,
  weighing the printed test pages, and calculating an amount of marking medium used to print the color at the particular dot value by subtracting a weight of the pages before printing from the weight of the printed test pages, and populating a reference device with the calculated amounts of marking medium for the plurality of colors.

Other features and advantages of the present disclosure will become apparent from the following detailed description, the accompanying drawings, and the appended claims.

DETAILED DESCRIPTION

Figure 1:
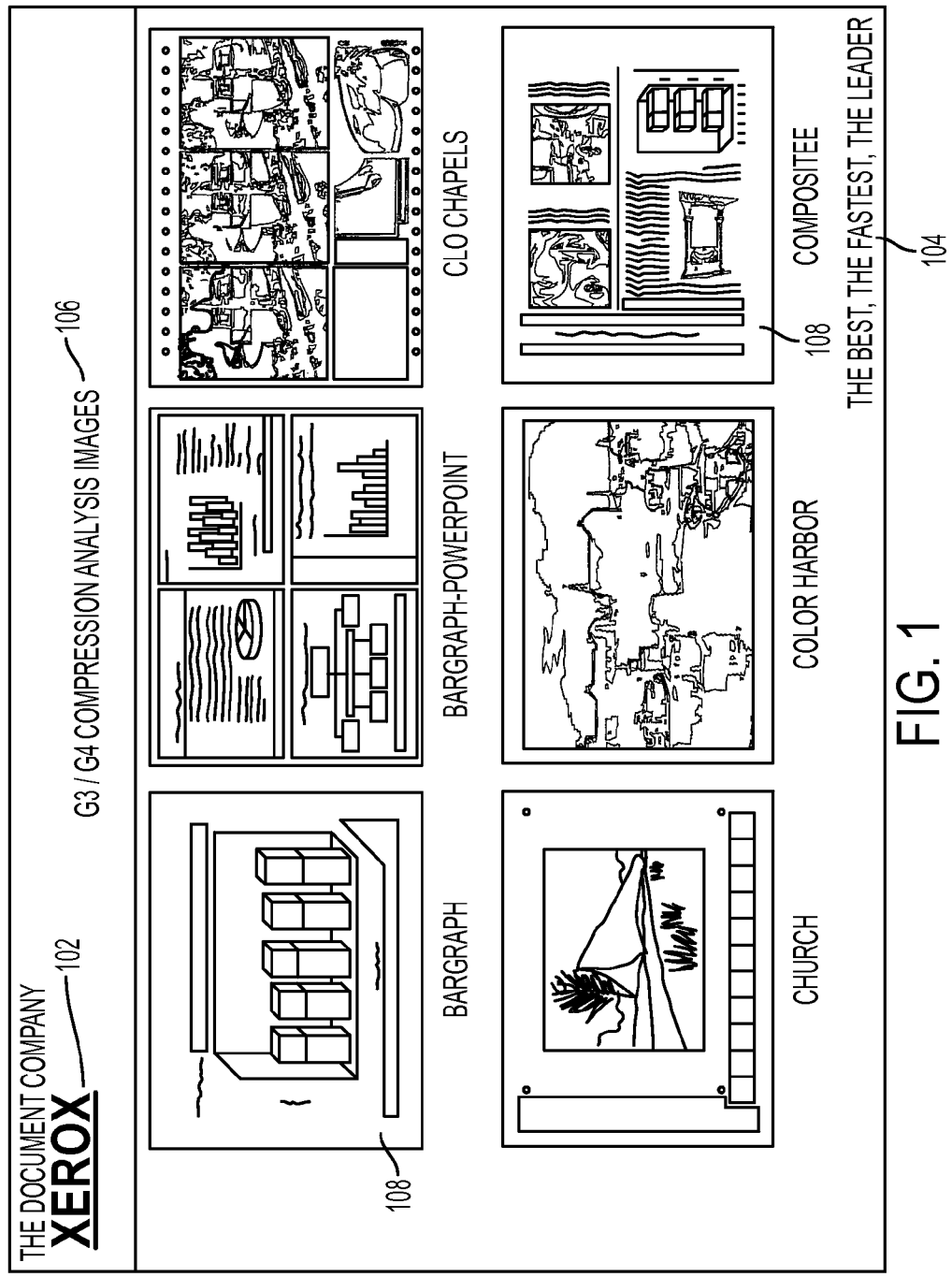
FIG. 1 illustrates a graphic representation of a page with text and objects therein in accordance with an embodiment of the present disclosure.

In order to increase the adoption of color usage in the marketplace, the following described system and method provides billing options for printing color pages. This disclosure proposes a method to solve the problem of charging customers for printing based on incorrect determination of color content of a document. Rather, the estimation of the cost for outputting a document is predicted or estimated based on the marked or projected color pixels of the electronic raster file, generic printer characteristics and settings, and printer performance. As further described below, the electronic image data of a document (or a subset of it) is processed, e.g., via a raster image processor (RIP), to determine numerical dot values representing a marking medium (e.g., toner or ink) of a particular density to be used from color planes, and the dot values are used to determine an amount (or dosage) of marking medium for printing the document. The amounts are then used to estimate a total amount of marking medium for output of the document, and a billing structure is determined based on the estimated total amount of marking medium.

Throughout this disclosure, color pixels are used as elements for determining and/or estimating billing costs. The term "pixel" as used herein is defined as an element of data that may be provided in any format, color space, or compression state which is associated with or readily convertible into data that can be associated with a small area or spot in an image that is printed or displayed. Generally, a pixel is defined in terms of value (or brightness or intensity) and its position in an image. A pixel may be associated with an array of other small areas or spots within an image, including a portion of an image, such as a color separation plane. Pixels in a color image may be defined in terms of a color space, with three values, such as RGB—R for red, G for green, and B for blue—or four values, such as CMYK—C for cyan, M for magenta, Y for yellow, and K for black, or composite black. A pixel may represent a percentage or level of gray or color (e.g., 0 to 255). An image generally comprises a plurality of pixels having a number of components that contribute to defining the image when it is either printed or displayed. The term "marking medium" used herein refers to a material that is used to mark pixels on a type of medium (e.g., paper) to output a page or document. For example, inks, dyes, toners, paint, or other pigments may all be considered types of medium.

Generally, in known output systems/devices (e.g., printers, copiers, MFDs), when a document is to be printed, it is input into a device and the image data is processed in an image path. Early in the image path when the image data is first processed, it may be determined if the input image data comprises black and white (or gray) pixels of image data, i.e., no significant color image data in one or more color planes, or if it comprises at least some color pixels. Then, in these known systems/devices, the image is determined to be a black and white or color image based on a pixel count determined during marking of the image data for output, and a billing strategy for outputting the document is employed.

An example of a document or page having a smaller amount of printed color content may comprise, for example, a document having a colored logo, colored areas on company letterhead, and the like, such as is shown in FIG. 1. FIG. 1 illustrates a graphic representation of a page or document 100 having a color text object 102 in a logo form on its top left and a color text object 104 on its bottom right. The remaining objects of the document 100 comprise monochrome text or line objects 106, and a plurality of monochrome graphic or monochrome halftone objects 108. For explanatory purposes only, objects 106 and 108 of FIG. 1 are considered to be of a black monochrome or grayscale composition (i.e., not comprising color pixels). Page 100 is an example of a page that may be input and output by an output device, such as an image processing apparatus. Generally, at least one page to be output is sent to an output device such as an MFD or a printer that may include at least the capability to print, copy, and/or scan documents. The types of objects to be output that are included in a document or page, of course, should not be limiting. For example, the page may include objects such as monochrome contone objects, monochrome text objects, monochrome line art, monochrome graphic objects, monochrome halftone objects, monochrome solid fill objects, color contone objects, color text objects, color line art objects, and/or color solid fill objects.

Outputting a color print job using a device (e.g., digital printer) uses an amount of medium (e.g., toner or ink) which may become a larger part of the total cost of the job. When a document such as page 100 is to be output for a print job, the small amount of color may slightly affect the cost for printing the color elements. However, when printing pages or documents having a number of color graphics, objects, texts, etc., a larger amount of marking medium is used, thereby increasing costs for printing, and thus a more precise estimation of print costs (including cost calculations for the amount of marking medium used) becomes a substantial part of the billing and print system for customers.

As previously noted, previous estimations of per page print jobs may have underestimated or overestimated the costs for an amount (or dose) of medium used to output or print a page. In current systems (e.g., digital printers), for example, toner (or ink) can easily constitute 70% of the per page print cost. Thus, it may be desirous from a customer's point of view to view an estimated bill for printing a document on a particular print device before outputting a job, as the type and amount of color in the document (as well as the device and device settings) will affect the billing structure to be used to print the document. Furthermore, the customer's relationship with the supplier may also affect the billing cost for printing (e.g., if a customer is provided with a fixed rate for medium and/or number of pages printed). From a supplier's point of view, fixing the price of a print job for document or page irrespective of the content of the image data may also not be acceptable.

Figure 2:
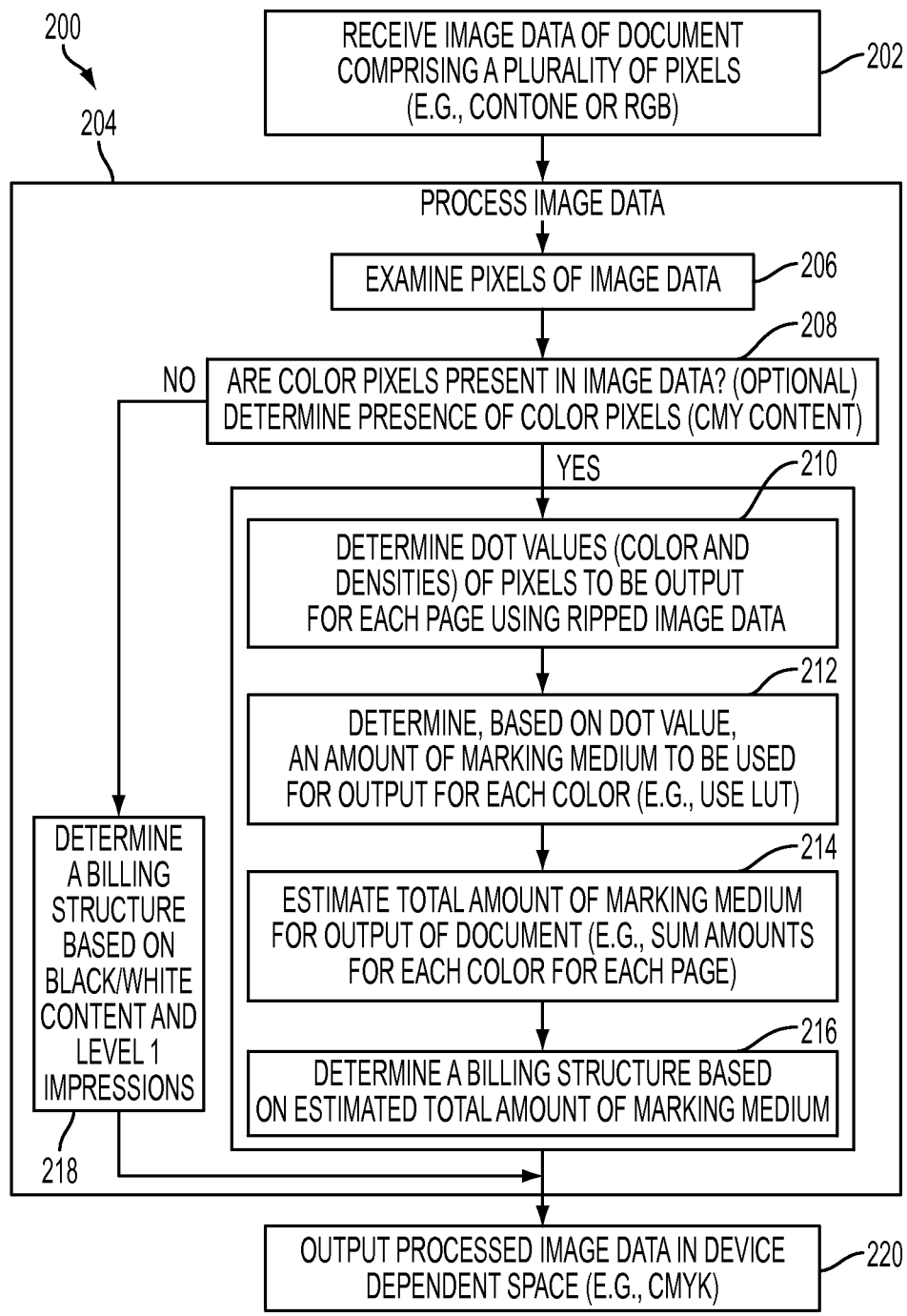
FIG. 2 illustrates a flow chart/block diagram illustrating a method for determining a billing structure for outputting documents in accordance with an embodiment of the present disclosure.

In order to accurately estimate and/or determine costs for outputting a document while considering the machine and the amounts of marking medium used, the present disclosure provides a method 200 for determining a billing structure for outputting documents based on the raster image of the image data, as shown in FIG. 2. Generally, a billing structure is a method by which a charge to a user or customer for printing a document is calculated. A billing structure may be a calculation method associated with or correlated with tiers, thresholds, values, or algorithms, for example. The electronic representation of the image data may be provided in any number of forms, e.g., provided in page description language (PDL) such as Portable Document Format (PDF; Adobe® Systems), PostScript (PS) language, Personalized Print Markup language (PPML), Intelligent Printer Data Stream (IPDS; IBM®), etc.

It is noted that application of medium correlating to each color plane may interlace in some areas of a document as a result of some color-to-color overlapping that, based on dosage, allows the printer to give the impression of an infinite number of colors to be printed (thereby building a plurality of resulting colors to the human eye). For example, in a contone raster representation of a document in a CMYK color space (cyan, magenta, yellow, and black), C and M, or C and Y, or M and Y, etc. may overlap to result in colors that appear different to the human eye. In the described example embodiments, the executed billing plans are designed to bill for the estimated amount of marking medium (from each color plane) needed for printing the determined color content of the rastered pixels, which may include gray or black content (K). However, in an embodiment, with regard to grayscale image data, the billing structure may be chosen based on composite black/color printing or black printing modes. In an embodiment, grayscale pixels will be counted as black. In any case, the exemplary embodiments herein are described with reference to counting color pixels including black or gray pixels, but should not be limiting. Also, the embodiments described herein include calculations based on a CMYK device dependent color space; however, it is to be understood that the calculations may be adjusted based on other or alternate color planes and should not be limiting.

Referring back to FIG. 2, the method 200 begins at block 202 in which a digital output device/image processing apparatus receives a document comprising at least one page of image data. The image data comprises a plurality of pixels. In some embodiments, the image data is received in device independent space. Alternatively, the image data may be in device dependent space. For example, the image data may be received in contone or RGB color space, or alternatively, comprise black and white pixels. The document of image data in block 202 is representative of any type of page and may include a variety of objects to be detected and used by method 200; however, method 200 may use a document that includes any combination of objects (including text). For example, the document may include objects such as monochrome color text object 102 and color text object 104 as provided on page 100 as shown in FIG. 1.

After receiving image data in block 202, the image data is processed (RIP) via a processor (e.g., such as processor or processing elements of FIG. 8) at block 204. Such processing may include transforming the input image data into device independent space, for example (so that further processing may be performed) before RIP. The pixels of the image data may be examined at block 206. In an embodiment, a sample of the image data, representative of the image data of the document, may be examined. For example, at least one page of image data in the document may be processed in block 204 that represents at least some of the colors to be used (marked or printed) in the document. In another embodiment, the image data for each page of the document may be examined. At block 208, an optional determination may be made to determine the presence of color pixels (e.g., CMY) in the page. If no color pixels or content are detected, i.e., "NO," then, at block 218, a billing structure is implemented based on no color content in the page having been detected (e.g., based on black/white content). The print/copy job would thus be billed at a black/grayscale content rate. However, the determination at block 208 need not be performed.

If, in block 208, color content is detected in the document (e.g., "YES," at least one color object/text/etc. is present in the document), or if such determination is not performed, then, at block 210, further examination of the pixels of image data are made (e.g., each pixel). Any one or number of methods for determining and accounting for each pixel (or a group of pixels) may be used and should not be limiting. Any number of methods for determining a color (e.g., from a gamut of colors the device or apparatus is capable of outputting), dot value, density, and/or a location of a selected pixel may be used and are within the scope of this disclosure. Referring back to block 210, numerical dot values of pixels to be output for each page is determined. When processing the color pixels in the raster image, each color pixel location is either counted as being a color (e.g., CMYK) pixel that is "on" or "off." The dot values of each of the colors for a pixel to be marked may also be determined. Throughout this disclosure, the numerical "dot value" is defined as a value representing pixels of one or more colors at a particular density which are determined to be printed for output based on the raster image. For example, if cyan pixels are printed based on a PDL density of 20%, 20% is the dot value used to process those cyan pixels.

In block 212, the numerical dot values are used to determine an amount of marking medium (toner or ink) to be used for output (printing) of the image data when in the device dependent space. In an embodiment, the determined amount may correspond to a mass or a weight of medium that would be used for printing. After an amount of marking medium for each color plane is determined, then, at block 214, the total amount of marking medium to be used for outputting the document is estimated and/or determined. In an embodiment, the total amount of marking medium to be used to print a document may comprise summing the estimated amounts of marking medium of each color plane determined for each page of the document. For example, if a document comprises 3 pages, then the estimated amounts of marking medium for printing yellow objects on each of page 1, page 2, and page 3 are added or summed to determine a total amount of yellow marking medium needed for printing the document. A billing structure is determined based on the estimated total amount of marking medium for printing the document in the device dependent space at block 216.

In an embodiment, a reference device may be used to determine the amount of marking medium (for printing the colors) based on the determined numerical dot value of each color plane, such as noted in block 212. A reference device refers to data that is associated with a particular machine and that is predetermined and stored for later use. In this case, the reference device may include data that correlates to color pixels, color planes, medium characteristics (density and/or mass), and the like that is used for printing documents on a machine. For example, the reference device may comprise one or more graphs or a look up table (LUT) that is/are used to convert each determined dot value into an amount of marking medium. The LUT may be a chart, table, algorithm or similar item comprising any data set suitable for determining an amount of marking medium used for a particular dot value of one or more color (e.g., an amount corresponding to a single color or combination of colors). To determine the data of the reference device, a calibration or similar method may be performed on an image processing apparatus, described below and shown in FIG. 3.

Additionally or alternatively, as previously noted above, a representative sample of pixels may be used to determine, based on the raster image data, the one or more colors and particular dot values to be output on one or more pages, and to determine, via the reference device, the amount of marking medium to be used for printing the one or more colors and dot values of one or more pages. For example, pixels that represent the color and dot values on the page(s) of a document may be used for calculations in method 200 (or for billing calculations in method 900, described further below). In an embodiment, at least one page of the image data is used. Alternatively, in an embodiment, each page in the document need not be processed, but, rather, a sample of colors and test pages may be selected as a representative sample for processing and estimating a document.

It is noted that the processing of the image data at block 204 of method 200 includes several sub-processes for determining a billing structure; however, they should not be interpreted as being limiting in any way. After the billing structure is determined (at either block 216 or block 218), the processed raster image for the document may optionally be outputted in the device dependent space using an output device or a printer (e.g., such as via output device 814 of FIG. 8). For example, a user may decide that a cost estimate (i.e., based on the determined billing structure) for printing a document is sufficient, and thus print the document. Alternatively, a user may decide that the estimated cost is too high, and may either change settings and/or output devices, or opt not to output the document.

As noted above, the billing structure is a method by which a charge for printing a document is calculated. In some embodiments, the billing structure may include a plurality of factors. In method 200 the estimation of the total amount of marking medium is determined separately for each color plane because, depending on the color to be output, the costs may change. For example, yellow medium may have a more expensive cost per microgram than micrograms of cyan medium. Alternatively, in some cases, whether separate total amounts are estimated or not, a customized billing structure could be offered to a customer that may not consider the individual amounts of color. Accordingly, it is to be understood that the method 200 can determine the total amounts of medium for each individual color as well as the total amount of color medium to be used for printing a document. It is also to be understood that such amounts of medium may be estimated based on representative color samples that may be used to print documents.

In some embodiments, a billing structure may include charging a customer for each page or sheet that is printed. In some embodiments, a billing structure may include a discount or reduction based on a volume of pages that are printed. In some embodiments, each method of the billing structures to be chosen may include an algorithm, formula, or other calculation(s) that are used to determine the charge for printing a page or document. The billing structure is at least chosen based on the estimated total amount of marking medium of each of the color planes needed to print the document. Also, however, the settings of a printing device (e.g., print mode (standard, color, enhanced) sampling, optical density, page settings, etc.) and the type of output device may affect the rastered image data. The estimated amount of marking medium to be marked for output may then be affected, and thus affected the chosen/determined billing structure.

As an example, with regard to the herein described determinations and estimations, such as shown in block 212 and/or block 214, it is noted that the amount of each color medium required for outputting a document may be affected by the type of apparatus being utilized. For example, in embodiments, a laser printer may be the system or apparatus used for output. The laser printer may use a photoconductor surface (e.g., rotating belt or drum) for attracting toner thereto. Control signals may be used, in combination with sensors, to control an amount of toner to be applied to the photoconductor surface from one or more supply devices for proper toner concentration for development. Thus, for example, the determined amount of medium in block 212 may correspond to a fresh amount of toner from a supply device that is to be dispensed. As another example, other machines may have additional colors and color combinations for output. Therefore, as shown by this example, the determination of the billing structure can be dependent on the estimated amount of marking medium as well as on the type and settings of the apparatus or output device being used to output or print the job.

Figure 3:
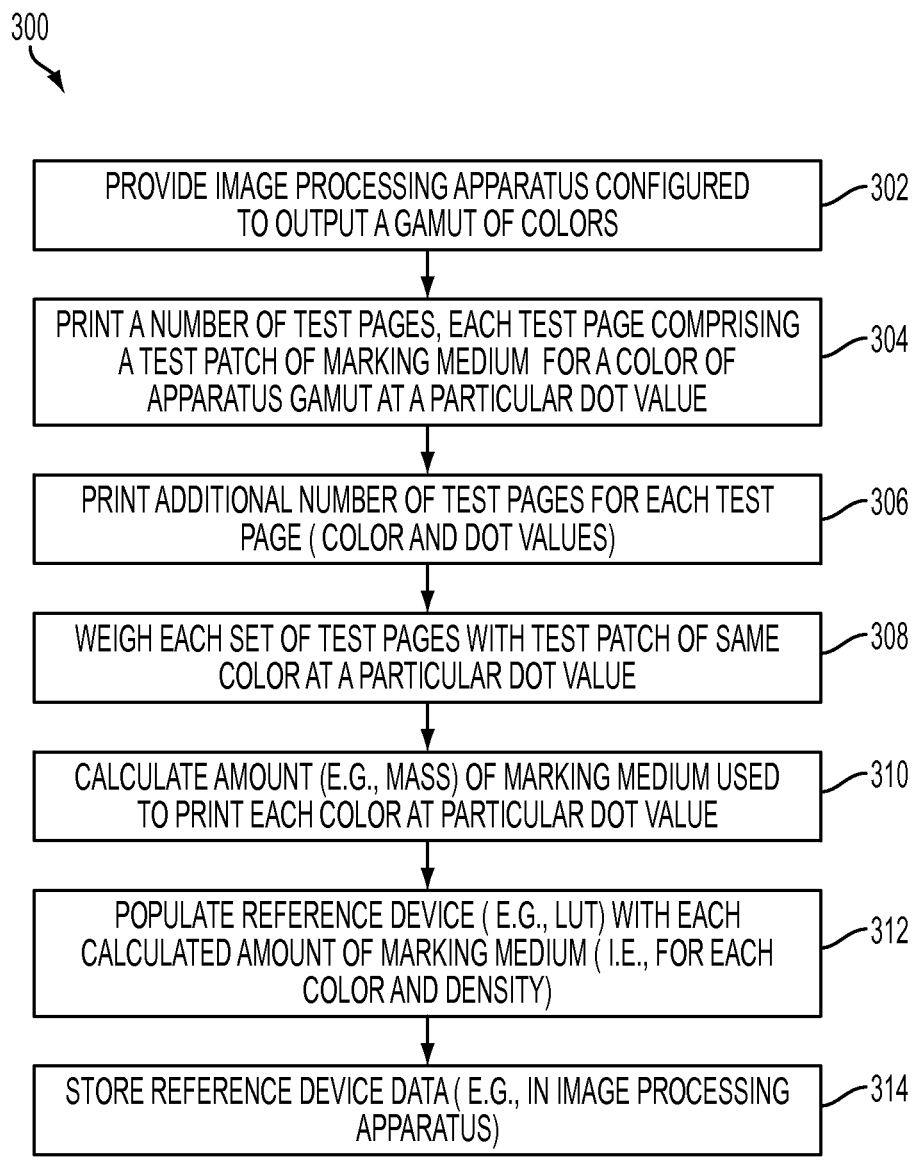
FIG. 3 illustrates a flow chart/block diagram illustrating a method for determining values of a reference device for a printing system or device in accordance with an embodiment of the present disclosure.

Because each type of output device may produce different results, this disclosure also presents a method that may be performed on an apparatus to determine the data of the reference device (gamut of colors for output, corresponding amounts (e.g., mass) of medium for each color at a particular dot value, optical densities, et al.) that is to be used with method 200 (block 214) for determining an amount of marking medium. FIG. 3 illustrates a flow chart/block diagram illustrating a method 300 for determining an amount of marking medium required for outputting documents. The values determined by method 300 may be used in a reference device for a printing system or apparatus. The method 300 may be applied to each type of printing system or apparatus that is capable of outputting a job. For example, if a customer has access (e.g., directly or via a vendor) to three (3) types of printing systems, data for a reference device for each printing system may be determined, so that when a job is estimated for output, a billing structure may be determined for one or more of the three systems (and used for calculating billing costs). The method 300 for calibrating the system or apparatus may be applied at the site of manufacturing or distribution, or on-site at a customer or vendor location.

Referring back to FIG. 3, the method 300 comprises providing an image processing apparatus (e.g., such as system 803 of FIG. 8) at block 302 for calibration. The provided apparatus may be an actual system for delivery to a customer or a vendor, a system that is being used by a customer or vendor, or a reference system that is used to determine reference data for a particular model of systems (and then the reference data would be applied to each distributed model). The image processing apparatus is configured to output a gamut of colors. At block 304, a number of test pages are printed. Each test page comprises a sheet with a test patch of marking medium representing image data comprising a plurality of pixels of a color of the gamut at a particular dot value. Any number or subset of possible output color combinations that the apparatus can output, i.e., based on the device gamut, could be used to print test patches. An additional number of test pages for each test page is printed, as shown in block 306. That is, for each color at a particular dot value, additional pages are printed. Thereafter, each set of test pages (i.e., test pages with test patches of a same color at a particular dot value) are weighed. The weighing of the test pages may be performed after a period of time (e.g., to allow the pages to recover from potential water loss or moisture content). The weighing allows for an average determination to compensate for any slight errors that may result during printing. After weighing, an amount of marking medium used to print each color at the particular dot value is calculated at block 310. For example, the weight of the test pages that are printed includes both the weight of the media (e.g., sheet(s) of paper) as well as the weight of the medium printed thereon. Thus, in an embodiment, to calculate the amount of medium, the weight of the unprinted page(s) (or unmarked media) may be subtracted from the weight of the test page(s) (i.e., the output, printed, or marked pages). For example, if a page A weighs a value B before printing, and after printing page A weighs a value C, then the amount of marking medium may be determined by subtracting B from C, i.e., C–B.

The amount of marking medium may directly correspond to the difference in weight of the page(s) before and after printing. Alternatively, in another embodiment, the difference may be used indirectly to calculate or determine the amount of the marking medium of the test page.

Then, in an embodiment, a reference device (e.g., a graph or LUT) may be populated with each of the calculated amounts of marking medium and any corresponding data (e.g., colors, dot values) for the apparatus in block 312. For example, in an embodiment, for a device where a finite number of test pages/colors are weighed, an analytical model may be determined based on the finite number of test pages/colors tested to calculate or estimate the weight/usage approximations for other color alternatives (e.g., that were not printed and weighed for output). The reference device and its data may be stored at block 314. For example, the data of the reference device may be stored in the system memory or storage of the image processing apparatus (such as in memory 806 or storage 810 of the system 803 of FIG. 8). In some cases, the data may be added, uploaded, or provided to new or existing systems and/or models similar to the provided image processing apparatus at block 302. For example, it may be necessary to only evaluate one reference printer for a particular model, and then the information and data determined by the calibration method 300 may be provided or added to the system of each replicate model. Additionally and/or alternatively, the data may be stored in other, non-limiting hardware devices and/or a software component for later use or adding to the system or other output devices.

As is known in the art, the dot value of the medium that is applied to the media (e.g., paper) during printing can be adjusted (e.g., via a control panel on a printer). Thus, when the pages are printed, not only are pages of possible color combinations printed, but pages of such colors at available print dot values for an apparatus are also printed. The dot values may include densities from 0 to 100 percent (%). Each of these particular dot value settings for each color may correlate to the numerical dot value used in method 200. For example, if a customer or user changes the settings, the dot value and thus the amount of the medium placed on a page may be affected either directly, i.e., by changing an optical density setting—or indirectly, i.e., based on the input or scanned graphics, text, etc. of the document. Thus, the dot value of the color associated with each pixel is determined or measured and considered in both methods 200 and 300.

The calibration method 300 is used to determine how much marking medium is used for each color at a particular dot value when marking and/or printing using a specific printer. That way, when the estimation at block 214 in method 200 is performed for a document, the estimations are tailored to the amounts of medium that that particular output device or apparatus applies as a result of its raster image processing.

The above-described method 300 for calibration was tested on an exemplary output device (hereinafter referred to as "example printer") using input image data. The example printer was a CMYK output device using toner as its marking medium. Pages with test patches representative of possible print jobs were selected, and the input electronic file containing these pages were processed to CMYK contone raster representation of the process color separations. In this example, the rastered electronic file was in the form of an Adobe® PDF file, comprising a number of pages of A4 size, which was processed for rastering at 300 DPI. Full pages were printed in C, M, Y, K, C+M, M+Y and C+Y and other color combinations within the device gamut at PDL densities from 0 to 100% (for every 10%). With the example printer, a total of 77 unique pages were printed. Several sets of these pages were printed. In this example, a total of 17 pages were printed for each color and particular dot value being analyzed. Then similar pages (i.e., with same colors and particular densities) were grouped together and averaged and weighed to calculate the toner masses used for each color combination and dot value.

Figure 4:
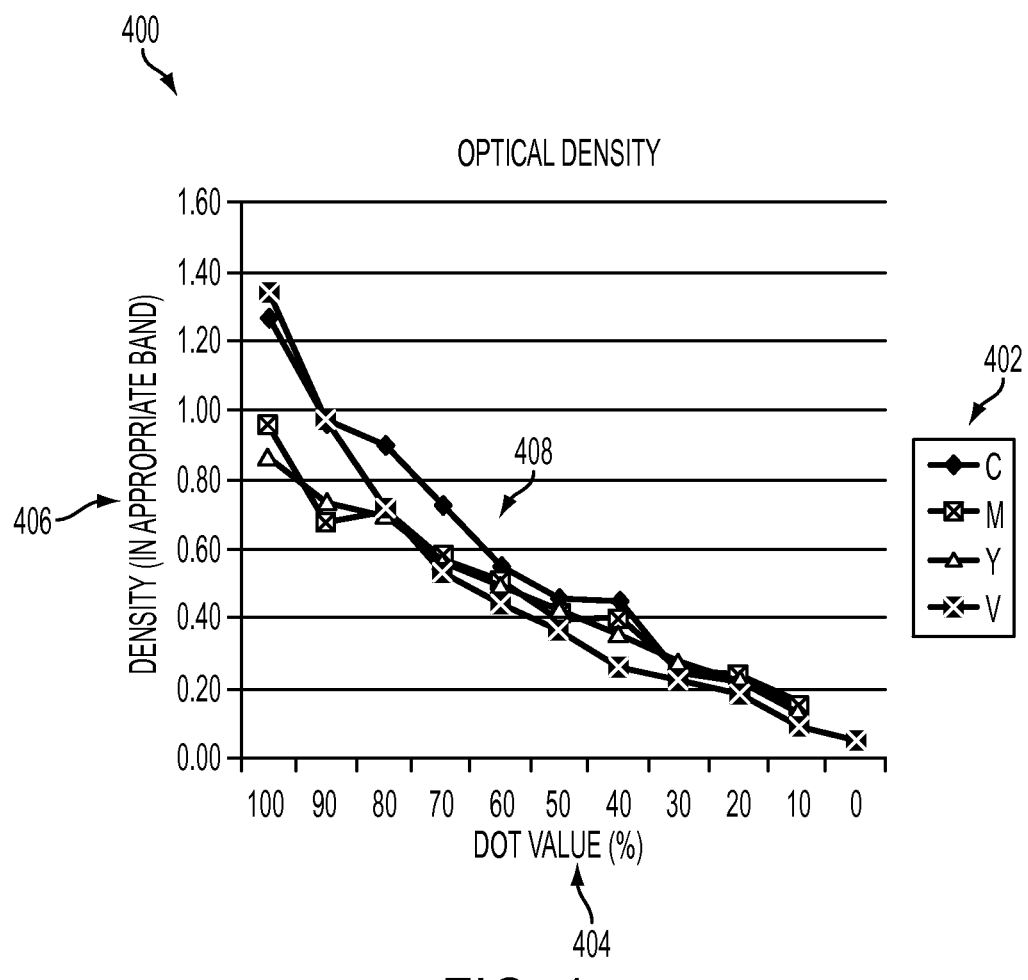
FIG. 4 illustrates a graph of an optical density for a tested, example printer having marking medium which may be applied for a number of color planes.

FIG. 4 illustrates a graph 400 representing optical density settings of the toner available for the example printer. In this case, curves 408 relating to the primary color planes (C, M, Y) are shown. However, it is to be understood that a number of other color combinations could be used. In particular, the graph 400 correlates measured densities 406 for numerical dot values 404 (e.g., percentages) for the primary color planes (C, M, Y), as well as densities 406 and dot values 404 for all of the colors put together, noted as V (e.g., black). As noted, test patches of toner were used for analysis in the example printer. As is known in the art, the denser the toner on a test patch, the darker the test patch will appear in optical testing. In order to determine and verify the density of the test patches that were tested, sensors were used to emit light at a given wavelength or range (i.e., in an appropriate band) and to detect light absorption of the test patch (or, oppositely, the reflection of the test patch). Based on the sensor detection of light, the density of each test patch of toner can be determined. Of course, it should be understood that the calculated curves 408 and computations of FIG. 4 are based on measured values for the 77 color combinations of the example printer, and such determinations can easily be adjusted to actual printing conditions, printer settings and color rendering selections used by the customer.

Figure 5:
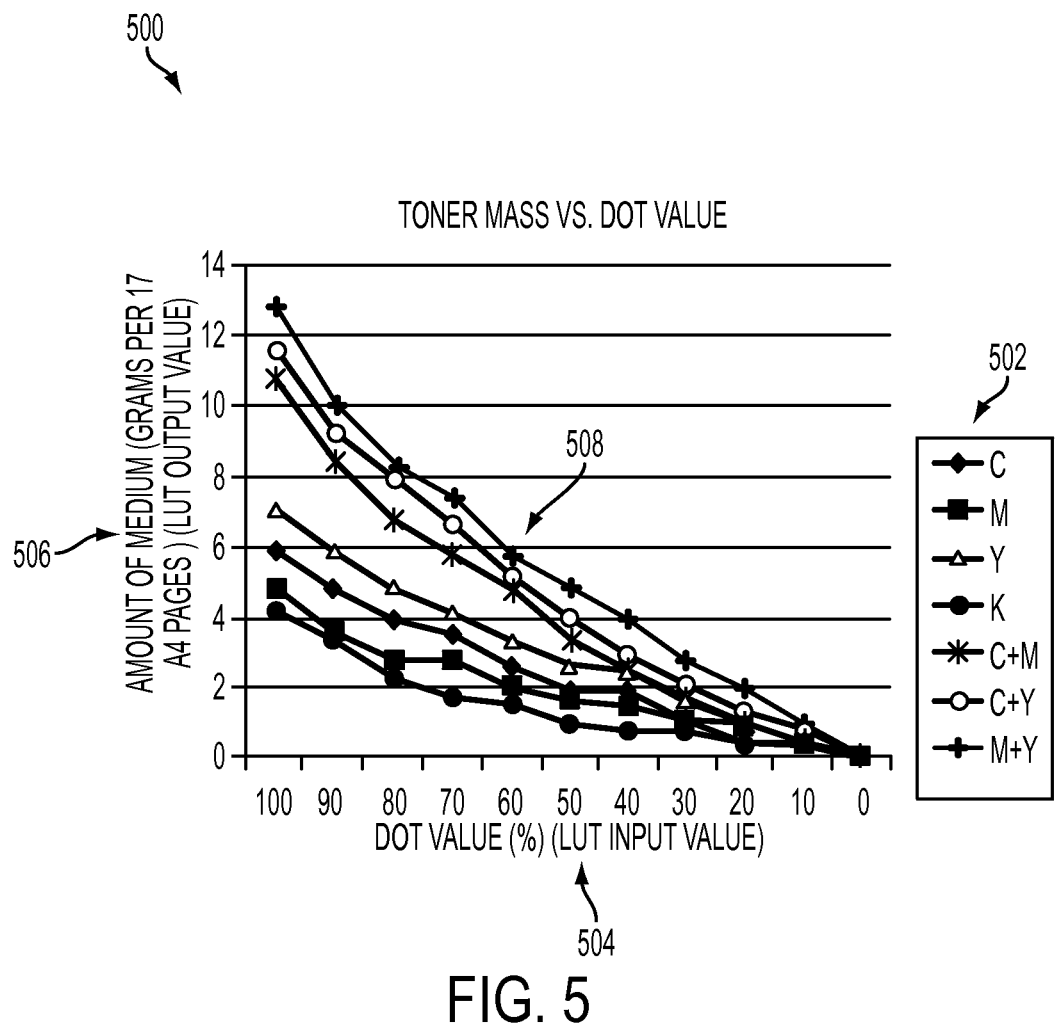
FIG. 5 illustrates a graph showing amounts of marking medium to be output for color planes for an example printer, which may be determined by the method of FIG. 3, and which may be used with the method of FIG. 2.

FIG. 5 illustrates a graph 500 showing the calculated curves 508 correlating the toner masses 506 determined to be output for numerical dot values 504 (colors and densities) for the example printer during processing. The toner mass is the amount of marking medium 506 that would be calculated at block 212. In this case, dot values 504 were analyzed for C, M, Y, K, R (M+Y), G (C+Y), and B (C+M). The graph 500 illustrates the range of numerical dot values 504 for each of these colors output by the example printer (i.e., each of the primary colors C, M, Y, K and overlapping colors R, G, B at densities from 0 to 100 percent, at each 10 percent) and the correlated mass of the toner 506 to be marked for each dot value (in the form of grams per 17 A4 pages). Thus, if one were to print a 17-page document using the example printer settings, and a numerical dot value for the color combination C+Y is determined to be 50, then the amount of marking medium needed to print 17 A4 pages using the C+Y color combination is determined to be 4 grams. (To calculate the amounts for a single page, each of the determinations would be divided by seventeen (17)).

As shown by the curves 508 in FIG. 5, an increase in numerical dot value (density) generally increases the amount of marking medium (toner) that is applied to the page(s). This graphical data may be used to populate the reference device for determining the amount of medium used for printing a document. In an embodiment, the calculations and corresponding data from the CMYK color curves 508 may be used to populate another reference device such as a LUT, as shown by block 312.

It should be noted that on this example printer, it was noticed that the two layer colors that are output—R (from M+Y), G (from C+Y) and B from (C+M)—resulted in weights that were a simple sum of their two primary components. That is, the amount of toner mass for color R was equal to the amount of toner mass of M plus the amount of toner mass of Y. This is evidence that 1D LUTs from smoothed CMYK curves can be convolved with the CMYK raster values, and that the individual color planes may be averaged to get the masses of C, M, Y and K used for printing. Essentially, averaging across the test pages gives an accurate toner usage prediction. However, in some apparatuses, as further described below, additional calculations may need to be provided to consider loss of toner and other errors to compensate for unequal application of medium from the supply devices.

Using method 200, a billing cost for outputting the document is calculated based on the determined billing structure. For example, the method 200 may determine that a document such as page 100 is associated with a billing structure requiring lower amounts of color toner. For example, based on the estimated medium for printing the document, the document may be billed by choosing a billing structure associated with a tier (e.g., Tier-1, Tier-2, Tier-3) based on the number of satisfied thresholds. That is, one or more thresholds may be used to separate billing tiers which may be used to charge a customer. Such multi-tier bill plans provide options to the customer which better match types of printed documents and workflows. Additionally, two-tier and three-tier meter billing plans may replace black-only and color-only billing structures, which is more satisfactory for the customer and supplier.

The tiers may be defined in any number of ways and may be dependent on a number of factors, including, but not limited to, the output device, the amount of medium to be marked, the supplier's available billing structures, or a customer-specific plan, for example.

A billing method such as method 200 may be of particular interest to companies in the high end digital print business such as printer vendors, print shops or workflow vendors. The method 200 also provides a more accurate billing cost estimate for digital printers, and is correctable for current operating conditions. For example, the disclosed method and system allows for new and additional cost options to be developed and tailored to customers. It allows for a customer choose from a selection of printers (if available) for different types of files and image processing (if required). Also, it allows for customization by using the customer's ICC profile and/or by considering any rendering adjustments selected for the device, which may in turn adjust the estimation algorithm for printing documents. For example, it allows for entry or alteration (e.g. via an interface on a machine or remotely) of a machine's optical density levels for each color of medium to be output. A user may select a 5 to 10 patch per primary on one page, for example.

Also, the calibration method 300 and method 200 can be performed using all types of image processing apparatuses (xerographic, inkjet, solid ink), and thus provide pricing/billing points for customers for different types of marking mediums, output devices, and settings.

Figure 6:
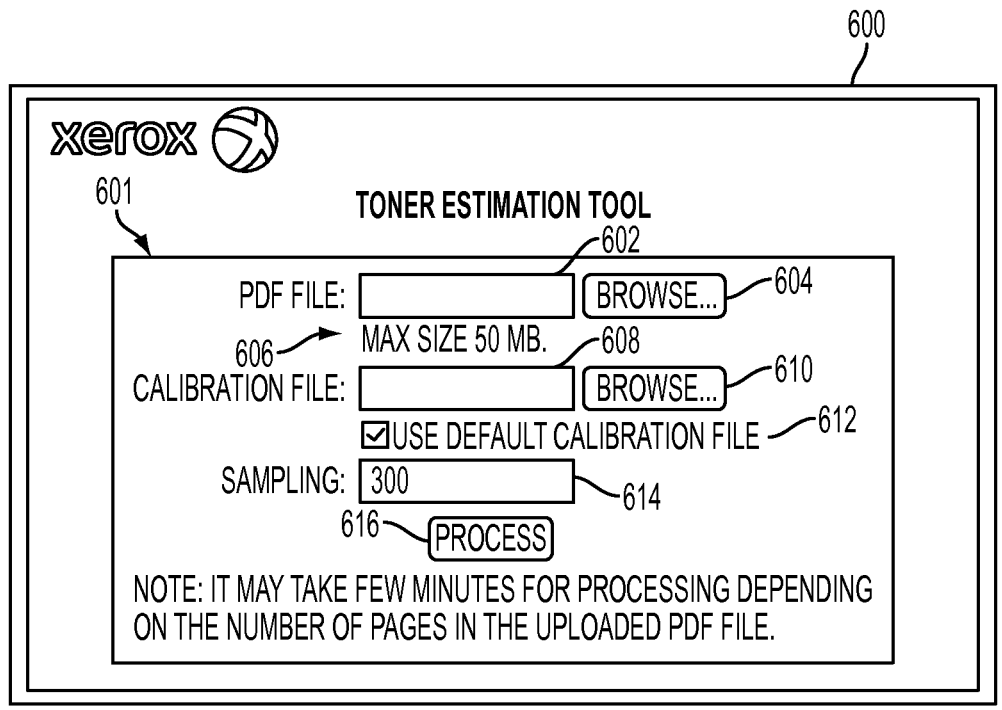
FIGS. 6 and 7 illustrate examples of screen shots from a web-based program used for determining the billing structure cost for outputting document according to the method of FIG. 2 in accordance with an embodiment.
Figure 7:
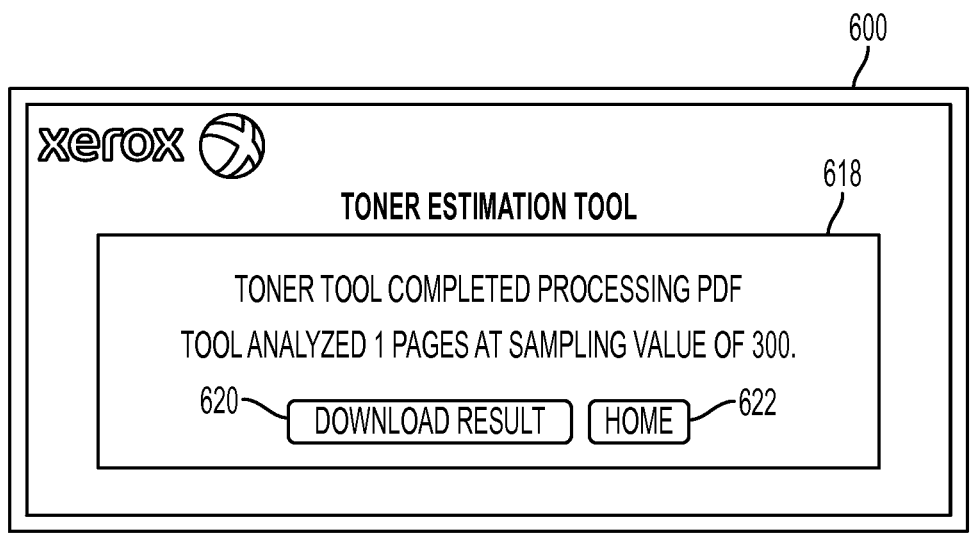

FIGS. 6 and 7 illustrate examples of screen shots from an interface 600 used for determining the billing structure and/or cost for outputting document according to the method of FIG. 2. The interface 600 may be provided directly with the system (i.e., accessed via a UI on the printer) or provided using a separate, remotely connected system (e.g., displayed on a display device such as a computer screen). In an embodiment, the method 200 may be provided as a tool for users that is offered as a web-based application or service, or a self-contained software module. In an embodiment, a system may utilize a network connection 822 for proposed billing estimates submitted via interface 600. For example, a user may submit a proposed job (e.g., document) to a website such that a cost estimate for outputting (e.g., printing) the job may be provided to the customer via such website. Then, after processing, the results may be displayed (or downloaded) via the website or interface. The network 822 may include any type of network such as the Internet, Wi-Fi, DSL, local area network (LAN), or wide area network (WAN), for example. In this case, the term "user" may apply to a customer, a vendor, or other person that wishes to analyze a document and its amount of marking medium required for output.

The interface 600 shown in FIG. 6 provides an input area 601 with various input fields 601, 608, and 614 to be entered. The file input field 602 is provided for accessing and/or uploading an electronic file. For example, a browse button 604 may be provided so that a user can search or access files via one or more available directories that are saved locally to a system. The type of file to be uploaded into file input field 602 may be limited to one or more specific types of electronic file (e.g., PDF) or any number of types. Additionally, a size of the file to be accessed and/or uploaded may be limited, as indicated at 606. Here, in this example, the maximum size is indicated as 50 MB at 606. However, the maximum sizes may be lower or higher.

The calibration file input field 608 is the reference device used to convert the numerical dot values to amounts of medium for each color combination (or separation). For example, an LUT may be input into the calibration file input field 608. A browse button 610 may also be provided so that a user can search or access a reference file via one or more available directories that are saved locally to a system. Alternatively, the user may select via a checkbox 612 to use the default calibration file. The default calibration file may be, for example, the reference device and its data configured during its calibration via method 300.

The sampling input field 614 is the sampling or sampling at which the input file in field 602 should be analyzed via the RIP. The sampling may be customized for each estimation using the toner tool. For this example, a 300 DPI sampling was input into sampling input field 614. In some cases, when using higher samplings (such as 600 DPI), lines in the rastered image data may be thickened or include errors, and could result in a slight overestimation of the amount of medium used. This may be evident in font intensive images, which use small amounts of toner, but are generally processed faster. However, such information is not meant to be limiting, and a user may, of course, input higher or lower samplings.

The interface 600 shown in FIG. 6 may be associated with a default or predetermined printing apparatus or system. Alternatively, such a system may be selectively chosen by a user accessing the interface 600. Although not shown, there may be a separate button and/or field for such selection. In operation, the user may set the parameters (e.g., printer type, and optionally, current densities, special settings (dot frequency, density settings) and sampling or processing sampling) and uploads the file via filling out the input fields 602, 608, and 614. The user can then submit the file for processing by pressing a process button 616. After a period of time (e.g., after ten to fifteen seconds) and upon completion of the processing, the interface 600 may be updated as shown by the area 618 in FIG. 7. For example, area 618 of interface 600 may indicate, among other things, that the system has completed processing of the input file, and provide a summary of the information used to process the file. The summary of information may include, but is not limited to: the document name, number of pages in the document, sampling or resolution at which the document was analyzed, etc. In an embodiment, the system provides a download button 620 via area 618 so that a user may download a separate file with the estimated job medium statistics, detailing the analyzed document and optionally its associated costs. The downloaded result presented via interface 600 could be any number of estimations and should not be limiting. In an embodiment, the amounts of medium for each color may be presented to the customer. For example, a submitted document may result in a determination of the number of micrograms of cyan toner, the number of micrograms of magenta toner, the number of micrograms of yellow toner, and the number of micrograms of black toner to be used either to output/print each page or to print the entire the document. Additionally or alternatively, the total number of micrograms of toner needed for outputting the document may be provided. Either or both of these determinations may be provided to the user. This may be useful for a customer who has a customized billing plan, for example, so that they can estimate their medium usage and thus the billing cost. In an embodiment, a size of the page and/or area (percentage) of coverage may be included. In some cases, the downloaded result may calculate the billing structure and costs and provide the calculations and total billing costs to the customer. In an embodiment, a billing structure and cost estimation may additionally and/or alternatively be provided to the user in the downloaded file.

Alternatively, the information of toner usage (mg), billing costs, etc. may be provided via the interface 600 (e.g., in area 618), or may be output using an alternate output device (e.g., a printer, screen, etc.).

In an embodiment, it is envisioned that the estimate of how much the job will cost may note the predetermined type of printing apparatus considered for output. As noted above, depending on the type of device, apparatus, or machine used for output, the cost estimate of the job may differ. Additionally, in an embodiment, it is envisioned that the system and/or website may estimate theoretical costs of the job if the document is printed with one or more alternative type of printing devices or apparatuses, and that such theoretical costs may be presented to the user (e.g., via the website). These alternative types may include but are not limited to, different brands or types of machines (e.g., company make and model), different output samplings/capabilities, or different print shops/vendors, for example.

A system and/or website may utilize a method such as method 200 to estimate such costs, for example. The system for analyzing the image data may be a separate system that the system used to print the image data. For example, if a user accesses the interface via a website, the system used to process the image data may be a remote system. However, the user may chose to print the image data at an alternative, remotely or locally connected printing system. In this case, the system used to process the image data input from interface 600 may comprise similar elements noted with respect to the image path of the system 803 in FIG. 8, including, but not limited to, a communication device (such as a network), examination element, cost calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example. Further description regarding such as system is provided below.

Such a device is advantageous to a customer as it allows the customer to review theoretical costs before any actual printing or marking occurs. The customer is able to decide, based on a cost estimate, if the job should be output (e.g., printed), without actually outputting the job. Furthermore, the customer may make a decision whether or not to output a job based on types of printing machines. For example, if the system/website includes cost estimates for outputting the job using one or more devices or apparatuses, the customer has the option of choosing a device for outputting the document (or not using the devices at all), based on the customer's pricing point. Also, besides changing output devices, the customer may be provided with the option to change the output or print settings (e.g., scan or print settings such as resolution) to change or determine cost estimates for printing within the customer's acceptable cost range.

The described features of interface 600 FIGS. 6 and 7 are not meant to be limiting, and it should be understood that other embodiments that may include additional or alternate user-prompted options and/or one or more interfaces may also be utilized with the herein described method 200. In an embodiment, a result file need not be downloaded by the user. For example, the results may be directly provided via the interface 600 in area 618, so that the results can be reviewed on a display screen. In another embodiment, the results may be printed on a page or sheet using an apparatus.

Figure 8:
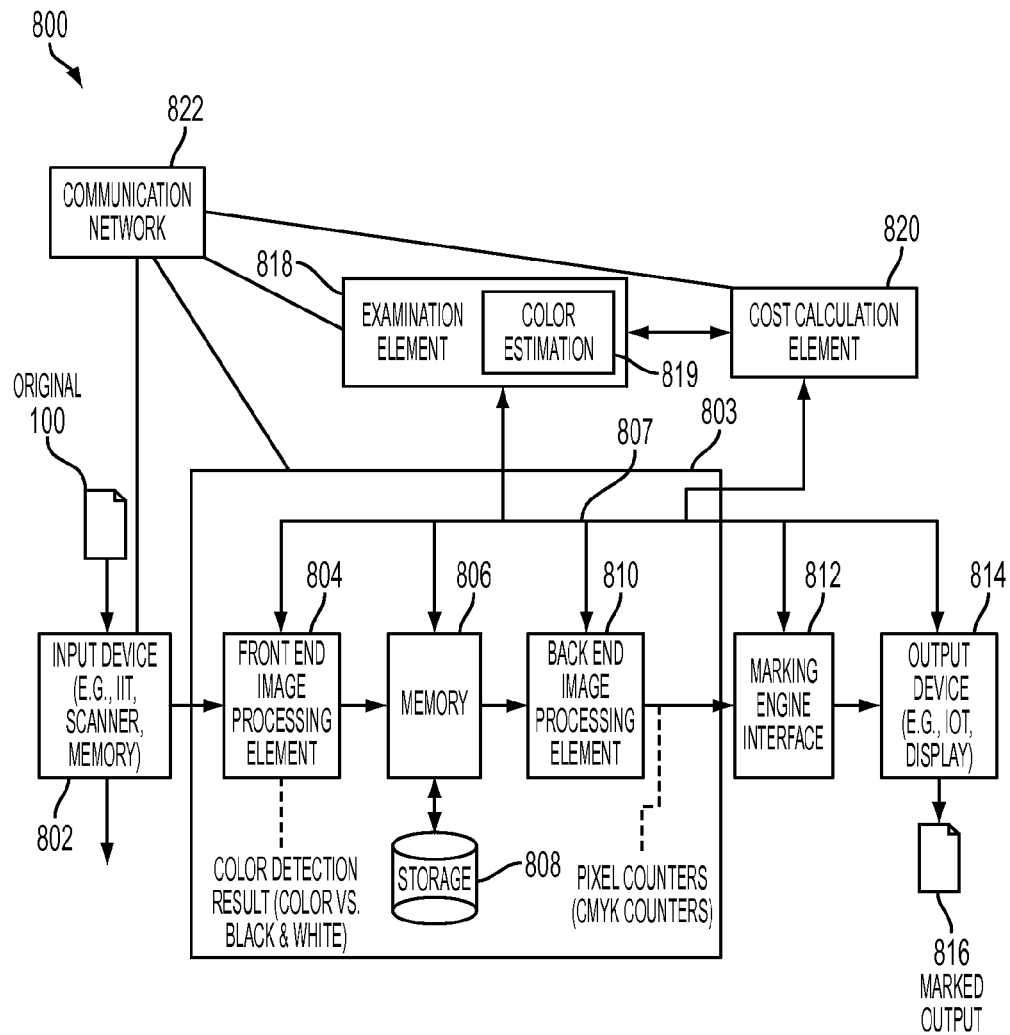
FIG. 8 illustrates a block diagram of an example of an image path for processing image data in accordance with an embodiment of the present disclosure.

FIG. 8 illustrates a block diagram of an example of an image path 800 for processing image data of a system, device or image processing apparatus 803, such as an MFD or a printer. The system/device/apparatus 803 comprises, among other devices, an input device (e.g., IIT or memory) 802, a processor or processing elements 804 and 810, a memory 806 and/or a storage device 808, and an output device (e.g., IOT) 814 and/or marking engine interface 812. The image path 800 of the system 803 may also include an examination element 818 and/or cost calculation element 820 which may be a part of the system 803 itself or in communication with the processing elements 804 and 810, for example. Generally, the above elements (as will be described) of the device are provided to perform functions that assist in receiving image data such as a scanned or input document, configuring the image path of the processing elements 804 and 810 (and possibly elements 818 and 820) to process the image data, and, if needed/approved, outputting the image data such as by printing a document according to an output mode that may be selected. However, it should be noted that the apparatus or device may comprise additional elements not described herein or alternative elements for performing similar functions, and should not be limited to those elements as illustrated in FIG. 8. Generally, the image path shown in FIG. 8 corresponds to any number of output modes that may be selected for an image processing apparatus, system, or device.

The input device 802 is used to deliver image data of a document to the system 803 and/or processing elements in the image path. In some embodiments, the input device 802 is used to scan or acquire an input document or page into image data, such as when copying a document, for example. The input device 802 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 802 may include submission of electronic data by any means and should not be limiting. In other embodiments, the input device 802 may be an electronic device for inputting electronic image data. In some embodiments, input device 802 may be connected to a network 822 or telephone system, for example, to receive input image data via a facsimile (fax) machine or computer (CPU) or other remotely connected device. Input documents and/or image data that is received electronically may be received via a telephone number, an e-mail address, an Internet Protocol (IP) address, a server, or other methods for sending and/or receiving electronic image data. The network 822 may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

In any case, image data, such as image data for an original document 100, may be received or input in either device dependent space or device independent space from the input device 802, depending on the capability of the input device or the architecture of the system. The input device 802 may capture image data as binary or contone image data, for example. Generally, when the input image data from the input device is received in device dependent space, the processing elements in the image path will typically convert such image data to some device independent space for further processing before converting the image data to device dependent space (e.g., to be output). The input and output devices deal with different device dependent color spaces, and most of the image processing in the image path 800 is performed in a device independent space to produce output images of the highest possible quality.

FIG. 8 also shows a processor or processing elements for processing and/or manipulating image data using a plurality of operations and/or processes, such as raster image processing (RIP). The description of the processing elements below is an example of devices capable of implementing processes to be performed and should not be limiting. For example, additional processing elements may be provided along the image path 800. Alternatively, additional operations may be performed on the image data other than or in addition to those described with reference to FIG. 8.

The image path 800 of system 803 may comprise a plurality of image processing elements (or processor) for manipulating image data received from the input device 802 using a plurality of operations and/or processes. The processing elements may be a combination of image processing elements which comprise software and hardware elements that perform a number of operations on the image data received from the input device 802 (e.g., IIT/scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multi-function device (MFD). For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the image path of FIG. 8 comprises a front end processing element 804, a memory 806, storage 808, and a back end processing element 810. Each of the devices or elements in the image path may be communication with each other, as represented by path 807. The front end processing element 804 is an image processing element that first receives image data in an image path and is used to process the image data according to user preferences, such that it may be stored and later retrieved (if necessary) for output. The back end processing element 810 is generally used at the end of an image path to retrieve stored image data (if necessary) and to process the image data such that the image data may be output to a printing device as an accurate recreation of the original input or scanned image. Of course, processing elements may also be used for compression and/or decompression of image data.

In an embodiment, one or more of the elements (e.g., processing elements 804, 810 and memory 806/storage 808) of system 803 may be connected to a network 822 or telephone system, for example, for communication with other devices, systems, or apparatuses. For example, in some cases, image data or executable instructions may be provided via a computer (CPU) connected to the network 822. As further described below, in a possible embodiment, at least one processing element of system 803 may implement an operative set of processor executable instructions of a billing system. Such a billing system or the executable instructions may be provided via the network 822, for example.

Each of the image processing elements comprises an input and an output. Additionally, the system, device, or apparatus may also include one or more controllers or routers (not shown) to select and route the image data between the processing elements 804 and 810 and memory 806 and/or storage 808, and other elements described below, for example.

Front end processing element 804 receives (as input) the image data from the input device 802 and processes the image data. The image data may be received as input via a scanning engine interface, for example, such as when copying and turning a hard copy document into image data. Alternatively, the image data may be received electronically, such as from a memory device, storage device (portable or remote), et al., such as when printing a saved document. As such, the form in which image data is received should not be limiting. Front end processing element 804 may be used to process the scanned image data of the electronic file as well as determine user-defined operations generally known in the art. For example, the front end processing element 804 may be used for color space conversion, reduction or enlargement, document registration, and/or performing other operations or processes on the image data, for example. In some embodiments, the front end processing element 804 converts the image data (e.g., from device dependent to device independent image data, when received via a scanner) for processing.

Memory 806 and/or storage 808 may be used to store image data. For example, memory 806 and/or storage 808 may be used to temporarily store the original image data of document input via input device 802. Converted (e.g., binary to contone image data) or compressed image data may also be stored in the memory 806 and/or storage 808. Memory 806 and/or storage 808 may be used to store machine readable instructions to be executed by the processor/processing elements. The memory 806 and/or storage 808 may be implemented using static or dynamic RAM (random access memory), a floppy disk and disk drive, a writable optical disk and disk drive, a hard disk and disk drive, flash memory, or the like, and may be distributed among separate memory components. The memory 806 and/or storage 808 can also include read only memory, or other removable storage drive(s) or memory devices.

The front end processing element 804 may communicate with memory 806 and/or storage 808 of system/apparatus 800 to store processed and/or compressed image data, for example. Compressed image data may be stored in memory 806 and/or storage 808 temporarily or for a later time when needed. When the image data is needed or it is time for marking (e.g., using the marking engine interface 812 or output device 814), the image data may be retrieved from memory 806 and/or storage 808 via the back end processing element 810 to export the image data that has been scanned, for example.

Back end processing element 810 receives processed image data from the memory 806 or storage 808. Back end processing element 810 may be used to further render the image data for output. For example, back end processing element 810 may be used to convert the color space of the processed image data (e.g., convert from device independent CIE L*a*b* color space to device dependent CMYK color space), provide color balance, further rendering, filtering, and/or other operations or processes (RIP). Subsequently, the back end processing element 810 may be used to decompress the image data and output the image data via the IOT 812 and/or output device 814. The output of processed image data from the back end processing element 810 depends on the image path (or output mode). The back end processing element 810 may be used for determining a numerical dot value of pixels in each color plane (as noted in block 210 of method 200) and/or for calculating the amount of marking medium to be consumed using marking engine interface 812 and output device 814 (as noted in blocks 212 and 214 of method 200). In the herein disclosed method, back end processing element 810 may be used (alone or in cooperation with other elements) to determine a billing structure, such as noted in block 216 of the method 200 in FIG. 2, and further described below with regard to FIG. 9. This way a customer can decide if a proposed billing structure for outputting a document is acceptable before the marking with the marking engine interface 812.

In embodiments, such as for solid ink products, color pixel counters may be provided in the system 803 at the backend of an image path, as shown in FIG. 8, which count the number of color pixels to be printed.

In an embodiment, the processed image data may be output to the marking engine interface 812 for printing using an output device 814, either directly or upon prompting or instruction. The marking engine interface 812 and/or output device 814 may be associated with a printer or an MFD which is used for printing documents. In some embodiments, the marking engine interface may be a part of the output device 814. The marking engine interface 812 and/or output device 814 may be used to output the processed image data via the printer, for example. Specifically, the marking engine interface 812 may be designed to receive the reconstructed and processed image data in device independent space in order to send or output the image data to the output device 814 (e.g., printer) for a copy or print job. The marking engine interface 812 may further perform image processing on the image data to make corrections or compensate for deviation in the printing process. Alternatively, the back end processing element 810 may be used to perform further image processing on the image data.

The marking engine interface 812 outputs processed image data to the output device 814 for outputting the image data of the document. The marking engine interface 812 may be used to mark media in a path of the system 803. The marking engine interface 812 and output device 814 may be associated with inkjet, solid inkjet, laser, wax, dye, and other technologies used for printing and outputting documents. The type of output device 814 should not be limiting. For example, the output device 814 may comprise an image output terminal (IOT), display, screen, printing device, copying device, MFD, or others devices, as generally noted above. The display or screen may be a part of a computer (CPU) or user interface (UI) or may be provided to relay information from a website or other device via a network 822, for example. In some cases, a UI may be provided directly on the apparatus/device, while in others a UI is provided as or via a separate electronic device (such as shown in FIG. 6).

In an embodiment, the processed image data may be output to a printer (e.g., drum or roll for applying to paper) to complete the image path, for example. Of course, the algorithms and processes used by the elements in the image path shown in FIG. 8 should not be limiting. Any number of data compression algorithms (e.g., lossless, lossy), decompression algorithms, color conversion algorithms (e.g., contone to binary, or binary to grayscale) and the like may be performed to provide a high quality output document 816.

The output print quality of image data from an output device 814 such as an MFD or a printer may depend the type of system or device (and its available output modes/sampling). In some cases, multiple print quality modes (PostScript driver), each with a different sampling, are supported. For example, the system/apparatus 800 may support print quality (PostScript driver) and/or copying print quality may include: fast color, standard, enhanced (factory default setting), high sampling/photo. Of course, these modes are just an example of modes that may be used for printing using the output device 814, and, therefore, should not be limiting.

However, it is noted that, although the illustrated embodiment of FIG. 8 shows marking engine interface 812 and output device 814 coupled to the system 803, the processing elements of system 803 need not be coupled to a printing or output system (directly or indirectly (e.g., electronically)). The marking engine interface 812 and output device 814 may be separate and distinct devices. That is, marking engine interface 812 and output device 814 are optional and need not be included for cost estimations. For example, as further described below, the herein disclosed methods may be implemented as computer readable instructions (in software or hardware) that are executed by a computer, processor, controller, system 803, or the like.

In a possible embodiment, the system 803 may further comprise one or more elements for determining a billing structure and/or a billing cost for outputting a page or document via an output device such as device 814. For example, as shown in FIG. 8, an examination element 818 and/or cost calculation element 820 may be provided. In an embodiment, the examination element 818 and/or cost calculation element 820 may be a part of the system 803. In an embodiment, the elements 818 and/or 820 are separate from the image path of the system 803. In an embodiment, the elements 818 and 820 may be directly or indirectly (e.g., electronically) coupled. In an embodiment, the features, calculations, and/or determinations provided by examination element 818 and/or cost calculation element 820 may be incorporated into one or more processing elements, such as elements 804, 810, or 812, and therefore such elements should not be limited to the illustrated embodiment.

Examination element 818 may be configured to examine the image data. The examination element 818 may assist in determining the amount of marking medium needed to print a document or page of image data. For example, the examination element 818 may comprise a color estimation element 819 that is configured to determine numerical values of pixels in each color plane to be output in device dependent space. The examination element 818 and/or color estimation element 819 may also estimate a total amount of marking medium to be used for output of a document.

The examination element 818 may operatively communicate with a cost calculation element 820. The cost calculation element 820 is configured to calculate a billing structure and/or an approximate cost for outputting the document of image data using the estimated total amount of marking medium for the document. The billing cost may be calculated and based on a determined billing structure. For example, if it is determined that a document is to be billed using a tier of a multi-tiered billing structure, the cost associated with the appropriate tier may be employed.

In an embodiment, the billing cost is further calculated based on a type of output device to be used. For example, when printing to a printer or an MFD, the chosen type of output device may alter the cost for printing the page or document due to the plurality of output modes, inks, toners, and other elements which contribute to the quality of the output document 816. In an embodiment, the cost calculation element 820 is configured to operatively communicate with the examination device 818 and at least one of the processing elements (such as 810 or 812) to calculate a billing cost for outputting the page and/or document.

In a possible embodiment, examination element 818 and cost calculation element 820 are part of a billing system to be implemented by an operative set of processor executable instructions configured for execution by at least one processor or processing element. The billing system may be provided at a remote location with respect to the at least one processor. In an embodiment, the at least one processor is provided in an image processing apparatus, which may comprise an input device for inputting image data and an output device for outputting image data. In an embodiment, the at least one processor of the billing system is provided at a remote location with respect to an output device. As noted above, at least one processing element of system 803 may implement the operative set of processor executable instructions of the billing system by communicating via the network 822, for example. The at least one processing element may thus be provided in the same or a remote location with respect to the output device. In some cases, the examination element 818 and/or cost calculation element 820 may communicate an approximate cost or billing cost to the processor/system 803. In some cases, the examination element 818 and/or cost calculation element 820 may be a part of the processor which communicates with system 803 or an output device.

In a possible embodiment, the cost calculated by the cost calculation element 820 (or its associated processing element) may be sent directly to the output device 814. For example, as shown in FIG. 8, the cost calculation element may communicate, via electronic path 807, the approximate billing cost to the output device 814. In this case, the cost may be output via a display, screen, or even a print job (e.g., printing a sheet with calculations and/or cost estimations thereon). Additionally or alternatively, another output device (e.g., computer screen) may be directly or indirectly coupled to the system 803 or cost calculation element 820 and may be used to display, print, or output the approximate billing cost for a job. By providing the cost in such a manner—i.e., before marking and outputting the image data via a printing or a copying output device—the customer can decide if the image data should be marked via interface 812 and output device 814, or if the data should be saved/discarded (e.g., such as if the cost is too high). The customer may also consider changing the output settings to reduce or alter a cost for printing a document if the cost is unsatisfactory. The customer may also choose to output the image data (e.g., via contact with network 822 or system 803) through the use of an activation button, for example.

Also, it is envisioned that an embodiment in accordance with this disclosure, a system may utilize a network connection 822 for proposed billing estimates. For example, as discussed with reference with FIGS. 6 and 7 above, a customer may submit a proposed job (e.g., document) to a website such that a cost estimate for outputting (e.g., printing) the job may be provided to the customer via such website. Then, after processing, the results may be displayed via the website (or downloaded). The network 822 may include any type of network such as the Internet, Wi-Fi, DSL, local area network (LAN), or wide area network (WAN), for example.

Figure 9:
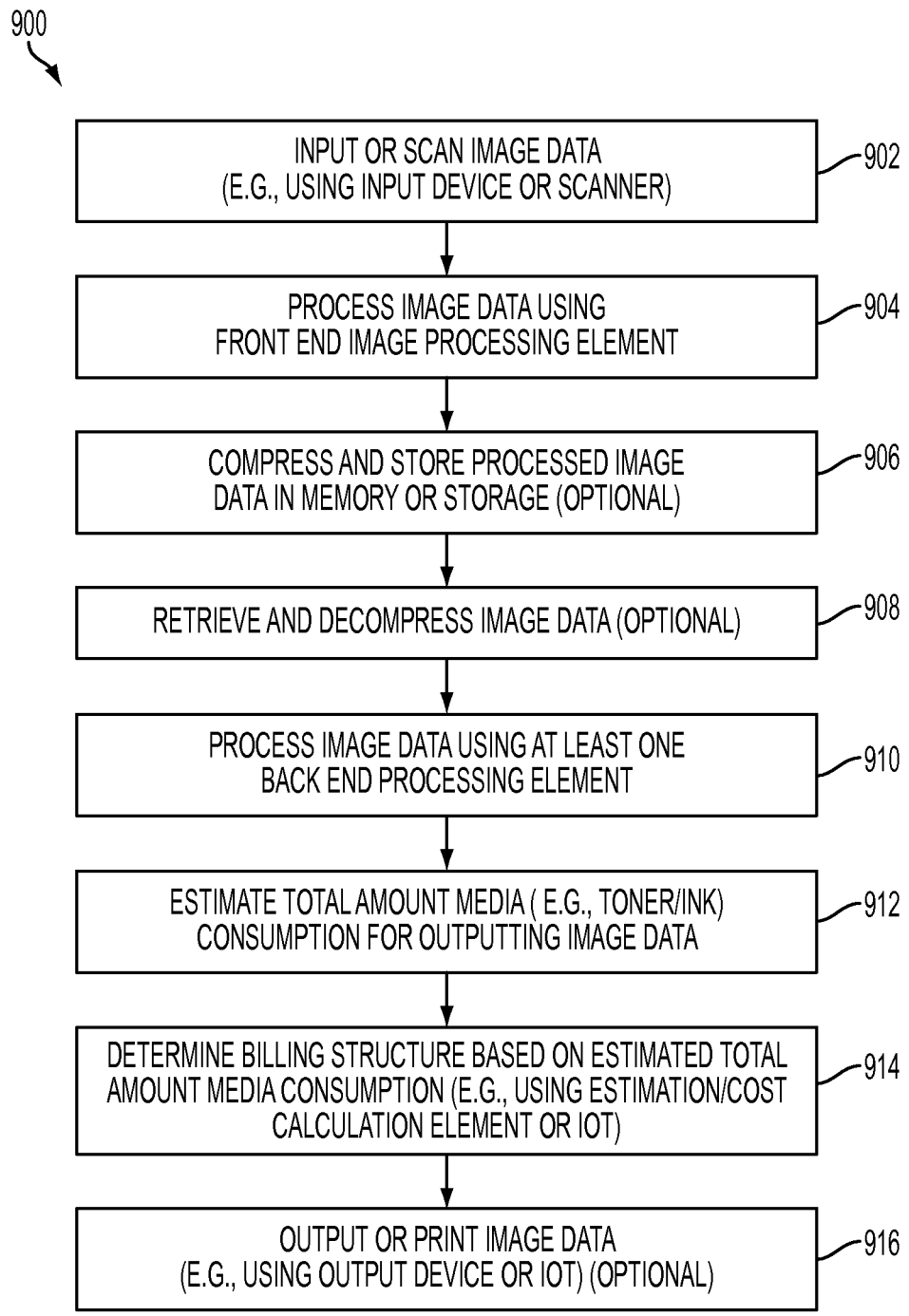
FIG. 9 illustrates a flow chart/block diagram illustrating a method of processing image data along the image path of FIG. 8.

FIG. 9 illustrates a flow chart diagram illustrating an exemplary method 900 of processing image data using the devices and elements along and in communication with the image path of the apparatus/device/system of FIG. 8. The method 900 comprises inputting or scanning image data at block 902 using an input device or scanner 802 (IIT) of an image processing apparatus or system as shown FIG. 8, for example. At block 904, for example, each page of the image data is processed using the front end image processing element 804. If needed, the input or received image data may be converted using the input device and/or processing elements. For example, in embodiments, the image data may be converted from device dependent space to device independent space (e.g., RGB to L*a*b*). Alternatively, the image data ma be received in device independent space (e.g., L*a*b*). The type of image data received and the type of input devices it is received therefrom should not be limiting.

The page(s) of image data may then optionally be further processed, compressed, and stored in memory 806 or storage 808 at block 906. When it is time to mark or output the image data, the image data may optionally be retrieved and decompressed at block 908. The image data may then be processed using at least one back end processing element such as 810 at block 910. For example, the image data may be converted from device independent space to device dependent space (e.g., contone CIE L*a*b* to binary CMYK). The amount of medium (toner or ink) consumption required for outputting the marked image data may then be estimated at block 912. The amount of toner/ink consumption may be estimated by the marking engine interface 812 or output device 814 such as when determining a pixel count (for each category of pixels) for output in device dependent space, for example. The pixel count of each color plane, along with its optical density, may be used to determine a numerical value associated with each color plane of pixels, and, thus, an amount (mass or weight) of medium needed for printing. Such information would be useful to a customer or supplier for replacing ink/toner or cartridges, etc. In some embodiments, the amount of medium consumption is determined using a reference device that is predetermined via applying a calibration method to the particular type of device. The reference device may be in the form of a graph or an LUT, for example.

The marking engine interface 812, estimation element 818 and/or cost calculation element 820 may then be used to determine a billing structure using at least the amount of estimated total amount of media consumption in block 914. In some embodiments, one or more of the elements/devices 812, 818, and/or 820 may work in cooperation with the front processing element 804 (e.g., communicating via path 807) to select a billing structure for the page. The image data may then optionally be output (e.g., printed or copied in device dependent space) using the output device 814 at block 916, if desired.

As such, the system and method described in this disclosure will bill customers for the amount of medium to be used to mark the pixels for output based on the raster image data. The herein described method 200 of determining a billing structure is advantageous as it better estimates the medium usage for documents because it is based on predetermined data calculated during a calibration method 300 applied to a particular machine to be used. Thus, a more accurate billing structure may be chosen for pages which include an amount of color.

Also, utilizing a billing structure such as illustrated by method 200 shown in FIG. 2 is advantageous over known billing methods based on toner/ink consumption using only pixel counters (e.g., at the back end of a system) because it provides a more accurate determination of each of the actual amounts (mass) of medium being marked for output on a particular machine. By using a simple dot value (density) measurement for the device gamut, each machine or device can be calibrated and corresponding amounts of medium are determined.

The method 300 of FIG. 3 generally describes an exemplary calibration technique for determining data that is used with the method 200. However, it is envisioned that other calibration techniques may be used to determine the reference data (e.g., mass or amount of medium used during output). In the above described example, it is understood that the electronic jobs file used with the example printer has been converted to the device dependent color space, also referred to as device primaries or "native color," i.e., the color space associated with the output device. These files—which describe the color space of a device—are sometimes referred to as ICC (International Color Consortium) profiles. In this case, because we are using a CMYK output device, the device dependent color space or native color is a CMYK color space. However, it should be understood that if an electronic file is provided in other representations and/or device independent color space (such as RGB, SWOP CMYK, or other known color spaces) for the calibration method 300, the processor of the output device (e.g., processing elements of FIG. 8) may process (RIP) the pixels of image data into device dependent space and then determine (and store) the data as noted above.

When the process of FIG. 3 is originally implemented, it is generally assumed that the printing system to which it is stored is marking with the same amount of marking medium each time when printing a document. However, in some instances, this may not be the case. For example, due to a combination of process drift, component aging or machine settings (such as darkness), the amount of marking medium being used may be altered. Such effects may become present as a machine is used (as a result of age or wear), or may be noticed if the printer to which the calculations and corresponding data are stored is not the same printer used for calibration. For example, if a representative model or example printer is used for the calibration process, it could be generally assumed the same amount of toner will be used for similar models to which the calculations are stored. It is noted that when calibration data is determined for a particular machine, such as the example printer noted above, the density of the pages as well as the amount of medium (e.g., toner mass) is measured, as shown in FIG. 4. Therefore, to compensate for possibility of these effects, a simple 10 point toner reproduction curve (TRC) in the color primaries of the customer printer can be measured, and then compared to TRCs in the reference machine (e.g., either an example printer used for calibration or the same machine before aging). Then, the numerical values, correlating amounts of medium, and other corresponding data can be modified or adjusted to reflect the customer machine.

Also, the calibration method 300 of FIG. 3 further assumes that the amount of medium usage is dependent only on the number (dot value) and density of the pixels for rastering, and is independent of the shapes which these printed pixels form. However, some Xerographic systems have demonstrated line width growth or shrinkage, often with a horizontal/vertical asymmetry in output documents. Therefore, it is noted that, in some embodiments, an additional step may be added to the calibration method 300 to test non-uniformities and/or other errors such as those noted above. Possible non-uniformities and errors such as these may be determined by observing printed patterns. As an example, testing was performed on the example printer noted above via printing fields of numerous 1-, 2-, and 4-point lines in each direction. After reviewing the printed patterns from the tested example printer, it was determined that twenty four (24) 1-point lines, twelve (12) 2-point lines and six (6) 4-point lines, horizontal and vertical weighed the same. Further, it was also determined that a field of 4-point lines printed at 50% density weighed half as much as the same set of lines printed at full (100%) density. Thus, for the above-tested example printer, errors in line width were undetected. However, if such linearity were not found in a system, a non-linearity correction algorithm could be applied to the system bytes to make the marked pixels more representative of the medium mass before performing the averaging and weighing of the pages and dot values of the reference document, such as shown in block 308. For example, appropriate 2D image processing functions could be applied to the pixels, before or after RIP to compensate for non-linearities. Such methods are generally known in the art and therefore not discussed in detail herein.

In addition, in some embodiments, when the printing system or output device is highly interactive, i.e., when the amount of medium deposited on the media is a function of both a drive signal for applying that color and what other colors are doing at that place of the page, it may not be an obvious or straightforward process when choosing values to put into the rasters to produce a medium use estimate. In the description of applying the calibration method 300 to the example printer above, a toner drive signal (a pre-halftoned contone value) was utilized and then the reference device (e.g., LUT) was applied to the determined numerical dot value of the pixels in each color plane to estimate the amount of marking medium for output. The following provides several example embodiments and methods for handling different types of interactive systems and determining amounts of medium usage:

a. For IBT systems (i.e., systems that use intermediate belt transfer technology, with rotating photoreceptors/individual drums of toner color designed to apply toner at a location on a belt, for example), toner may be lost in subsequent transfers due to back transfer in the presence of downstream toner. This loss could accumulate to a substantial loss (e.g., 5 to 6 percent (%) of the toner). Thus, a correction color renditioning dictionary (CRD) may be used by the processor (RIP) to compensate for such toner loss, which would thereby include counting or including the lost toner in the usage/estimated total amount of medium to be used. Calibration (using the CRD) could be performed separately for each color, which would therefore not suffer back transfer (e.g., because another color is not overlapped thereon).

b. For image-on-image (IOI) systems, downstream separations may sometimes need to be overdriven to overcome development loss in the presence of previously deposited colors. However, when determining amounts of medium for IOI systems, this over drive boost, which is built into the system's ICC profile, is not used or included in the determination/estimation.

c. In another embodiment, if a detailed knowledge of the marking process of a system is known, the image data may be RIPped to an appearance space (L*a*b*, RGB, or some generic CMYK), which allows for the determination of how the toner and pixels would look on the page as compared to how much toner is applied or makes it to the page for development. A system model connecting toner deposition (out of the developer) may be used to color the appearance space and to map the appearance pixels to an amount of marking medium being used (e.g., in order to compensate for potential toner/ink loss).

Of course, the above embodiments and described interactive systems are exemplary. Other systems or methods could be implemented and/or altered to consider medium loss or compensation so that a more accurate determination can be made when estimating a total amount of toner (or ink) for outputting a document.

During processing and determining a billing structure, the method 200 may, in some embodiments, be implemented with additional steps and/or considerations. This, in turn, may affect the estimation of the total amount of medium usage and thus the billing costs. For example, an estimated RIP time for a document could be considered and/or altered (e.g., to make RIP time faster) depending on the needs of the customer. Such alterations could include changing system settings or the type of image printing apparatus for output. Also, suggestions for alterations to the file to improve RIP performance or document appearance may be considered. For example, changes to a file (such as color space or image sampling for output) may be considered in order to provide an improved output product (through cost and/or appearance). Generally a vendor or supplier could make such suggestions. Alternatively, multiple constraints could be entered by a customer. In any case, the additions and/or considerations for determining an amount of medium and billing structure should not be limited.

Also, in embodiments, the type of rendering strategy used during RIP may alter the determined billing structure and cost to output a document. For example, a desaturated color, i.e., in general, any color produced by non-zero components of red, green and blue (RGB) primaries, can be printed with a blend of CMY inks (or toners) or many blends of CMYK, replacing some of the CMY with K. In the latter case less total ink is used, easing the fusing or drying job. Some early printing systems may have used only CMY. Early techniques for CMYK rendering of colors are sometimes referred to as under color removal (UCR) and/or gray component replacement (GCR). Generally both UCR and GCR reduce gray components of color pixels and are replaced by black. Such strategies such as UCR/GCR or TRC correction, for example, may be applied to the image data, which could alter the billing structure, particularly because the cost of black medium may be relatively lower than the cost of color (CMY) medium. Other advantages of UCR/GCR include greater color stability, improved gamut and smoother image appearance upon output.

Moreover, in addition estimating the total amount of medium usage based on the numerical value of the pixels of the electronic raster image, the method 200 may consider additional inputs wherein medium is used or consumed to produce a better estimation. For example, estimations of other medium usage to be considered may include an amount of medium used in calibration, medium that may exit through a cleaner, medium that may be lost through purges, and medium that falls during development. In embodiments, these other amounts of medium usage may be added via registration marks (e.g., amounts per page). Additionally, in some embodiments, transfer efficiencies of medium may be measured, to directly compensate for loss of medium. In other embodiments, the estimated amounts of medium-on-paper may be increased to indirectly cover any medium which may be wasted or lost. For example, in some instances approximately 5 percent to approximately 15 percent of toner medium (it can differ for each color) may not fuse with or be applied to a page, thus falling into a waste container or the machine. Such estimations or approximations can be built into the calculation for usage and therefore billing for each color.

In yet another embodiment, the output device may perform some form of calibration/cleaning that uses medium on a per page or per usage rate, and this medium usage could be estimated and added to the estimated total amount of medium to be down on the media (e.g., paper). In some embodiments, a customer may be informed of an estimate of the consumables used in a start up for each job (e.g., the amounts of medium may be separately listed on a display or printed estimation sheet).

Other embodiments include incorporating the above methods into a set of computer executable instructions readable by a computer and stored on a data carrier or otherwise a computer readable medium, such that the method 200, 300, or 900 is automated. In a possible embodiment, the methods may be incorporated into an operative set of processor executable instructions configured for execution by at least one processor. FIGS. 2, 3, and 9 show flow charts of such computer readable instructions. For example, in some embodiments, memory or storage of an output device carrying instructions is configured such that when the executable instructions are executed by a computer or processor, they cause a computer or processor to automatically perform a calibration method or a method for determining a billing structure for outputting documents. Such instructions may be contained in memory 806, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the methods 200, 300, and/or 900. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

As previously noted, in some cases, systems or devices may be equipped with a plurality of output modes which may alter the quality and thus the sampling or dot values used to output the image data. For example, when the output sampling is lowered, the number of color pixel locations and/or dot values in image data also decreases, while increasing sampling increases the number of color pixel locations and/or dot values used in outputting image data. Therefore, a page/document may be billed at a lower metered rate if printed in a lower quality setting (e.g., Standard, Fast Color), or a more expensive metered rate if printed in a higher quality setting (e.g., High-Sampling/Photo), because, as shown by the graph of FIG. 5, for example, the higher the numerical dot value of the pixels, the greater the amount of marking medium used to print the document. Of course, color correction methods may also adjust the billing structure chosen.

It is envisioned that additional algorithms or methods may be provided to be utilized in addition to the above disclosed methods so as to offset incorrect billing, when required. For example, in some embodiments, the cost calculation element may calculate the billing cost based on a type and settings of an output device used. This allows for adjustments such that customer would not be charged or billed more for printing in a lower or alternate sampling/output mode. For example, a faster (lower sampling) print quality mode as output may use color pixels of a lower value and/or reduced color gamut to print a given page, and, therefore, the same page may be tallied on a lower (less expensive) meter when printed in a faster mode, because less medium is used to output the job (e.g., less colors and/or less amount or thickness of marking material).

In addition, it should be noted that the system/apparatus 800 may include a display or control panel user interface (UI) that allows a customer to read the billing meter. Meter reads may be used for cost-per-copy pricing, for example. Such meter reads can be obtained by accessing the local user interface on the control panel, or, alternatively, by accessing a remote user interface using an Internet or web connection. For example, a simple interface may be provided that enables a customer or supplier to manage, configure, and monitor networked printers and MFPs from a desktop or laptop using an embedded web server. The location and accessibility of the billing meters on the display/control panel interface should not be limiting. For example, a user may scroll through a list of the billing plans that are available directly on the machine, as well as the billing costs associated therewith, or on a computer (such as via interface 600 of FIG. 6). In some cases, the billing meters can also be viewed on a usage profile report. Such a report may be printed or electronic. In the case of an electronic report, for example, one may access such information via a network and an appropriate IP address associated with the device. This information may be accessed via a browser, for example, at a customer's or vendor's or other remote location. In an embodiment, the device or system updates the usage in real time. Thus, the billing meters that are accessible via a remote location will match the billing meters of the user interface and its displayed counters.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 803 may be a computer system which includes a bus or other communication mechanism for communicating information, and one or more of its processing elements may be coupled with the bus for processing information. Also, the memory 806 may comprise random access memory (RAM) or other dynamic storage devices and may also be coupled to the bus as storage for the executable instructions. Storage device 808 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A method for determining an amount of marking medium required for outputting documents using an image processing apparatus, the image processing apparatus comprising a processor for processing documents containing image data, the image processing apparatus configured to output a gamut of colors, the method comprising:
 printing a plurality of test pages for a plurality of colors within the gamut with the image processing apparatus, each test page comprising a test patch of marking medium representing image data comprising a plurality of pixels at a particular dot value; and
 for test pages with test patches of a same color and a particular dot value,
  weighing the printed test pages, and
  calculating an amount of marking medium used to print the color at the particular dot value by subtracting a weight of the pages before printing from the weight of the printed test pages, and
 populating a reference device with the calculated amounts of marking medium for at least the plurality of colors.

2. The method according to claim 1, wherein the reference device is a graph or look-up table (LUT).

3. The method according to claim 1, further comprising: storing the reference device in the image processing apparatus.

4. The method according to claim 3, further comprising:
 receiving image data of a document, the image data comprising a plurality of pixels and the document comprising at least one page of image data;
 for at least one page of image data in the document that is representative of colors used in the document:
  processing the pixels of the image data using the processor into raster image data comprising pixels of one or more colors;
  determining, based on the raster image data, the one or more colors and particular dot values to be output, and
  determining, via the reference device, the amount of marking medium to be used for printing the one or more colors and dot values of the page;

estimating a total amount of marking medium to be used for colors and dot values to print the document, and determining a billing structure based on the estimated total amount of marking medium.

5. The method according to claim 4, wherein the raster image data comprises pixels to be output in at least one color plane selected from the group consisting of: cyan (C), magenta (M), yellow (Y), or black (K).

6. The method according to claim 4, wherein the estimation of the total amount of marking medium for the colors and dot values in the document comprises summing the determined amount of marking medium to be used for printing each page with the same color and dot value.

7. The method according to claim 4, wherein the image processing apparatus further comprises an image output terminal for outputting documents, and wherein the method further comprises:

outputting the processed image data of the document in device dependent space using the image output terminal.

8. The method according to claim 4, wherein the image processing apparatus further comprises an input device for inputting documents, and wherein the method further comprises:

receiving the image data of the document using the input device, the input device being selected from the group consisting of: an image input terminal, a memory device, or a storage device.

9. The method according to claim 4, wherein the determined billing structure is based on a multi-tiered threshold value.

10. The method according to claim 4, further comprising:
calculating a billing cost using a cost calculation element for printing the document based on the determined billing structure.

11. The method according to claim 1, wherein the test patches comprise pixels to in at least one color plane selected from the group consisting of: cyan (C), magenta (M), yellow (Y), or black (K).

12. A non-transitory computer readable medium having stored computer executable instructions, wherein the computer executable instructions, when executed by a computer, directs a computer to perform a method for determining an amount of marking medium required for outputting documents using an image processing apparatus configured to output a gamut of colors, the method comprising:

printing a plurality of test pages for a plurality of colors within the gamut, each test page comprising a test patch of marking medium representing image data comprising a plurality of pixels at a particular dot value;

for test pages with test patches of a same color and a particular dot value, weighing the printed test pages, and calculating an amount of marking medium used to print the color at the particular dot value by subtracting a weight of the pages before printing from the weight of the printed test pages, and populating a reference device with the calculated amounts of marking medium for the plurality of colors.

13. The medium according to claim 12, wherein the reference device is a graph or look-up table (LUT).

14. The medium according to claim 12, wherein the method further comprises:

storing the reference device in the image processing apparatus.

15. The medium according to claim 12, wherein the test patches comprise pixels in at least one color plane selected from the group consisting of: cyan (C), magenta (M), yellow (Y), or black (K).

16. The medium according to claim 12, wherein the method further comprises:

receiving image data of a document, the image data comprising a plurality of pixels and the document comprising at least one page of image data;

for at least one page of image data in the document that is representative of colors used in the document:

processing the pixels of the image data using the processor into raster image data comprising pixels of one or more colors;

determining, based on the raster image data, the one or more colors and particular dot values to be output, and determining, via the reference device, the amount of marking medium to be used for printing the colors and dot values of the page;

estimating a total amount of marking medium to be used for the colors and dot values to print the document, and determining a billing structure based on the estimated total amount of marking medium.

17. The medium according to claim 16, wherein the raster image data comprises pixels to be output in at least one color plane selected from the group consisting of: cyan (C), magenta (M), yellow (Y), or black (K).

18. The medium according to claim 16, wherein the estimation of the total amount of marking medium for the colors and dot values comprises summing the determined amount of marking medium to be used for printing one or more pages with the same color and dot value.

19. The medium according to claim 16, wherein the determined billing structure is based on a multi-tiered threshold value.

20. The medium according to claim 16, further comprising:
calculating a billing cost using a cost calculation element for printing the document based on the determined billing structure.

* * * * *